Patented July 11, 1939

2,165,956

UNITED STATES PATENT OFFICE 2,165,956

CHLORO-METHYL ALKYL PHENOLS

Arnold Brunner, Frankfort-on-the-Main, Germany, assignor to I. G. Farbenindustrie Aktiengesellschaft, Frankfort-on-the-Main, Germany No Drawing. Application February 26, 1937, Serial No. 128,025. In Germany March 5, 1936

10 Claims. (Cl. 260—623)

The present invention relates to condensation products and to a process of preparing them.

I have found that chloro-methyl groups may be introduced into such phenols as contain in the nucleus one or more long aliphatic chains having at least 4 carbon atoms, as for instance butyl- or octyl-phenol, by a treatment with aqueous formaldehyde-solutions saturated with hydrochloric acid, advantageously at a temperature between 50° C. and 100° C. This could not be foreseen; it was rather to be expected that the reactivity of the phenols would be diminished too much by long aliphatic radicals or that the reaction would occur in quite another manner.

The chloro-methyl compounds obtained correspond to the general formula: $R \cdot A(OH) \cdot CH_2Cl$ wherein $A(OH)$ means the radical of an aromatic hydroxyl compound, R means an aliphatic radical containing at least 4 carbon atoms, and are viscous or thickly liquid, resinous, brownish colored substances which dissolve difficultly in water and easily in most of the organic solvents. They allow a variety of reactions on account of the exchangeable chlorine atom and are valuable intermediates for the preparation of dyestuffs, artificial resins, tanning agents, auxiliary agents in the dyeing industry and other products.

Furthermore, I have found that the condensation products, obtainable by treating phenols containing aliphatic side-chains having at least 4 carbon atoms with aqueous formaldehyde-solutions saturated with hydrochloric acid, may be caused to react with organic nitrogen bases, which may also contain acid groups (for instance, sulfogroups), with formation of new condensation products containing nitrogen. The reactions, which occur with evolution of heat, may be carried out in the presence or absence of a solvent at ordinary or raised temperature (advantageously at a temperature up to about 100° C.). If suitable solvents are used, the products precipitate in some cases, so that they may be separated from the mother-liquor. The aqueous solutions of the products, insofar as they do not contain acid groups, are apparently not changed by addition of acids whereas, on addition of alkalies, they precipitate with decomposition when heated or standing for a prolonged time.

By these reactions with primary, secondary and tertiary bases products are obtained which, in part directly, in part with aid of alcohol, are soluble in water; by reaction with aminosulfonic acids alkali soluble products are formed. They are suitable for use, for instance, as auxiliary agents, for dyeing, for making textile fibers repellent to water and as fungicides and as insecticides.

The products obtained by reaction with tertiary bases contain the group which has the formula:

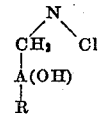

wherein N represents the nitrogen atom of an organic base, A(OH) means the radical of an aromatic hydroxyl-compound and R means an aliphatic radical having at least 4 carbon atoms.

The following examples serve to illustrate the invention, but they are not intended to limit it thereto; the parts are by weight:

(1) Into a solution of 24 parts of paraformaldehyde in 400 parts of strong hydrochloric acid there is introduced at 50° C. hydrochloric acid gas until the solution is saturated and at the same temperature there are added in the course of 4 hours, while well stirring, 41 parts of technical isooctylphenol, advantageously in the molten state. During the addition of isooctylphenol and for a short time thereafter there is conducted a feeble current of hydrochloric acid gas through the solution.

The resinous product is separated from the mother liquor and either dried with precaution under reduced pressure or isolated by dissolution into an organic solvent drying by means of calcium chloride and distillation of the solvent. It contains about 15 per cent. of chlorine (calculated: 13.95 per cent. of chlorine on entrance of one chloro-methyl group and 23.43 per cent. of chlorine on entrance of two groups). The brownish colored viscous resinous mass is soluble in ether and other organic solvents, and difficultly soluble in water.

(2) Hydrochloric acid gas is conducted at 60° C. into a mixture consisting of 120 parts of paraformaldehyde and 1300 parts of strong hydrochloric acid until the solution is saturated and, at the same temperature, 142 parts of isobutylphenol are added in the course of 4 hours. After having introduced hydrochloric acid gas at 60° C. for about 8 hours further, the whole is worked up as described in Example 1.

The brownish syrupy product, soluble in organic solvents and difficultly soluble in water, contains 17.84 per cent. of chlorine (calculated: 17.88 per cent. on entrance of one chloro-methyl group).

(3) Hydrochloric acid gas is conducted for 24 hours in a mixture consisting of 12 parts of paraformaldehyde, 300 parts of strong hydrochloric acid and 51 parts of diisooctylphenol while raising the temperature gradually from 50° C. to 90° C. The product is worked up as described in Examples 1 and 2. The analysis shows 8.52 per cent. of chlorine (calculated on the entrance of one chloro-methyl group 9.69 per cent. of chlorine). The product is a viscous brownish resinous mass, which is difficultly soluble in water and easily soluble in organic solvents.

(4) By using 160 parts of isododecylphenol, 1200 parts of hydrochloric acid and 80 parts of para-formaldehyde there is obtained in the course of 15 hours, while heating at 50° C., a product which contains 12.9 per cent. of chlorine (calculated 11.43 per cent.). It is of brownish color, viscous, difficultly soluble in water and easily soluble in organic solvents.

(5) 57 parts of isobutylisooctylphenol yield on heating at 70° C. for 20 hours with 400 parts of hydrochloric acid and 12 parts of para-formaldehyde a product containing 12.25 per cent. of chlorine (calculated 11.70 per cent.). The physical properties of the product correspond with those of the product obtained according to Example 3.

(6) From 105 parts of n-dodecylphenol there is obtained with 1000 parts of hydrochloric acid and 50 parts of para-formaldehyde in the course of 10 hours while heating at 50° C. a product containing 9.5 per cent. of chlorine.

(7) By using a technical mixture from isododecyl-, isotridecyl and isotetradecylphenol, there are obtained products the content of chlorine of which lies between about 10 and about 12 per cent.

(8) 20 parts of the chloro-methyl-compound of isobutylphenol the manufacture of which is described in Example 2, are dissolved in 60 parts of benzene. This solution is run in the course of about 1½ hours into a solution of 20 parts of pyridine in 100 parts of benzene, while stirring and cooling to 15° C. The product separates and is filtered with suction and dried under reduced pressure. By dissolving it in a small amount of alcohol and precipitating with acetone it may be recrystallized and melts then, with decomposition, at 260° C. The colorless substance is readily soluble in water or alcohol, hardly soluble in benzene, acetone or petroleum ether.

(9) 4 parts of the chloro-methyl-compound of isododecylphenol the manufacture of which is described in Example 4, are dissolved in 10 parts of acetone and 4 parts of pyridine are added; self-heating occurs. After boiling for two hours in a reflux apparatus, the acetone and the pyridine in excess are distilled and a yellowish viscous resinous mass is obtained which is readily soluble in water and alcohol, less readily soluble in benzene or acetone and more difficulty soluble in ligroin.

A weak aqueous solution, of about 1:1000, shows in an especially high degree a peculiarity which is shared also, but in most cases in a less marked degree by the products of the other examples: namely, when such a solution, which is by no means viscous, is heated nearly to boiling in a glass vessel, the bubbles formed cling to the walls and do not rise or rise only slowly.

(10) 116 parts of the chloro-methyl-compound of iso-octylphenol the manufacture of which is described in Example 1, are heated with 116 parts of pyridine, for about one hour to water-bath-temperature. The pyridine in excess is then distilled (most advantageously under reduced pressure). The yellowish resinous residue is water-soluble.

(11) 6 parts of the chloro-methyl-compound of dodecyl-phenol, the manufacture of which is described in Example 4, are dissolved in 60 parts of petroleum ether. While stirring and cooling, the solution is run into a solution of 6 parts of triethylamine in 20 parts of petroleum ether. The product is then filtered with suction and dried under reduced pressure. It forms a solid resinous substance of feebly yellowish color which is readily soluble in water and alcohol, less readily soluble in benzene and difficulty soluble in ligroin.

(12) 10 parts of the chloro-methyl-compound of di-iso-octylphenol, the manufacture of which is described in Example 3, are dissolved in 30 parts of petroleum ether. After addition of 10 parts of pyridine heat is developed, but no precipitation occurs. After distilling the solvent a yellowish resinous mass is obtained, which is easily soluble in organic solvents, but only sparingly in water. Its alcoholic solution of about 10 per cent. strength may be diluted with any amount of water without producing precipitation.

(13) 62 parts of the chloro-methyl-compound of dodecylphenol, the manufacture of which is described in Example 4, are dissolved in 100 parts of alcohol and 22 parts of methyl-aniline are added. The reaction develops heat. The whole is boiled under reflux for about one hour, and such an amount of alcohol is added, that a solution of about 10 per cent. strength is formed. This solution may be diluted with any amount of water; advantageously it is run, while stirring, into the desired amount of water. A homogeneous, lacteal-colloidally turbid solution is obtained.

(14) By using in Example 13, 20 parts of aniline instead of 22 parts of methyl-aniline, a product is obtained, which may be worked up in the same manner as that described in Example 13 and possesses similar properties.

(15) 11.8 parts of the chloro-methyl-compound of iso-octylphenol, the manufacture of which is described in Example 1, are dissolved in 30 parts of dioxane. The solution is added to a solution of 10 parts of sodium sulfanilate in 15 parts of water, whereby heat is generated. After stirring for a short time, 2.7 parts of sodium carbonate are added and stirring is continued for some hours, until the mass has become homogeneous and water-soluble. By precipitating by means of a mineral acid and filtering with suction the product may be obtained as a sulfonic acid. After drying, it constitutes a brownish pulverizable mass. By dissolving in water and sodium carbonate and subsequent evaporating the water-soluble sodium salt may be prepared.

(16) 27.7 parts of the product obtained according to Example 7 are dissolved in 50 parts of petroleum ether and 25 parts of pyridine are added. After several hours, the precipitation begins which is completed after about 40 hours. It is filtered with suction, washed with a small quantity of petroleum ether and dried under reduced pressure. The colorless hygroscopic solid substance dissolves easily in water and alcohol and difficultly in acetone, ether and petroleum ether. The melting point lies between about 200° C. and about 212° C.

(17) 50 parts of the product obtained according to Example 7 are introduced in to 90 parts of pyridine in the course of about 2 hours; the temperature being maintained at about 70° C. The product is a yellowish salvy mass which dissolves in water with a colloidal turbidity.

(18) 54 parts of the chlorine-containing compound obtainable according to Example 7 are dissolved in 140 parts of hexahydrobenzene and a solution of 20 parts of quinoline in 40 parts of hexahydrobenzene is gradually added. When the main reaction is finished, the whole is heated to boiling for about 5 hours, cooled, filtered with suction, washed with hexahydrobenzene and dried under reduced pressure at ordinary temperature or at about 60° C. The product is solid, resinous, hygroscopic, dissolves easily in water and alcohol, and difficultly in benzene, acetone and ether.

I claim:

1. The process which comprises heating phenols substituted in the nucleus by aliphatic hydrocarbon radicals having at least 4 carbon atoms with aqueous formaldehyde-solution saturated with hydrochloric acid.

2. The process which comprises heating at temperatures between 50° C. and 100° C. phenols substituted in the nucleus by aliphatic hydrocarbon radicals having at least 4 carbon atoms with aqueous formaldehyde-solution saturated with hydrochloric acid.

3. The process which comprises heating at temperatures between 50° C. and 100° C. aromatic hydroxyl-compounds containing in the nucleus one aliphatic hydrocarbon radical having at least 4 carbon atoms with aqueous formaldehyde-solution saturated with hydrochloric acid.

4. The process which comprises heating at temperatures between 50° C. and 100° C. compounds of the formula:

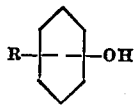

wherein R means an aliphatic hydrocarbon radical having at least 4 carbon atoms, with aqueous formaldehyde-solution saturated with hydrochloric acid.

5. The compounds of the general formula: A.CH₂Cl wherein A represents the radical of a phenol substituted in the nucleus by aliphatic hydrocarbon radicals having at least 4 carbon atoms, the compounds being resinous brownish-colored substances, difficultly soluble in water and easily soluble in organic solvents.

6. The compounds of the general formula: A.CH₂Cl wherein A represents the radical of a phenol substituted in the nucleus by one aliphatic hydrocarbon radical having at least 4 carbon atoms, the compounds being resinous brownish-colored substances, difficultly soluble in water and easily soluble in organic solvents.

7. The compounds of the general formula:

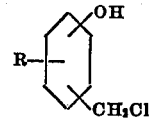

wherein R represents an aliphatic hydrocarbon radical having at least 4 carbon atoms, the compounds being resinous brownish-colored substances, difficultly soluble in water and easily soluble in organic solvents.

8. The compound of the general formula:

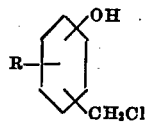

wherein R means a mixture of aliphatic hydrocarbon radicals containing from 12–14 carbon atoms, the compound being a resinous brownish-colored substance difficultly soluble in water and easily soluble in organic solvents.

9. The compound which corresponds with the formula:

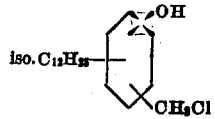

being a viscous substance of brownish color, difficultly soluble in water, easily soluble in organic solvents.

10. The compound which corresponds with the formula:

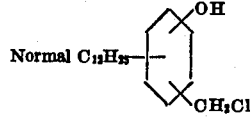

being a viscous substance of brownish color, difficultly soluble in water, easily soluble in organic solvents.

A. BRUNNER.